(12) United States Patent
Yoo et al.

(10) Patent No.: US 12,440,595 B2
(45) Date of Patent: Oct. 14, 2025

(54) AIR CLEANING APPARATUS FOR VENTILATION SEAT AND METHOD OF CONTROLLING OPERATION OF APPARATUS

(71) Applicants: Hyundai Motor Company, Seoul (KR); Kia Corporation, Seoul (KR); Hyundai Transys Inc., Seosan-si (KR); WOORY INDUSTRIAL COMPANY, LTD., Yongin-si (KR)

(72) Inventors: Han Su Yoo, Hwaseong-si (KR); Jung Sang You, Hwaseong-si (KR); Seon Chae Na, Yongin-si (KR); Byung Yong Choi, Hwaseong-si (KR); So Young Yoo, Suwon-si (KR); Sun Woo Kim, Hwaseong-si (KR); Ho Sub Lim, Hwaseong-si (KR); Hwa Jun Lee, Hwaseong-si (KR); Bum Jin Kim, Yongin-si (KR); Byung Wuk Kim, Yongin-si (KR); Do Young Goo, Yongin-si (KR)

(73) Assignees: HYUNDAI MOTOR COMPANY, Seoul (KR); KIA CORPORATION, Seoul (KR); HYUNDAI TRANSYS INC., Seosan-si (KR); WOORY INDUSTRIAL COMPANY, LTD, Yongin-si (KR)

( * ) Notice: Subject to any disclaimer, the term of this patent is extended or adjusted under 35 U.S.C. 154(b) by 496 days.

(21) Appl. No.: 17/945,471

(22) Filed: Sep. 15, 2022

(65) Prior Publication Data
US 2023/0293762 A1 Sep. 21, 2023

(30) Foreign Application Priority Data
Mar. 21, 2022 (KR) .......................... 10-2022-0035004

(51) Int. Cl.
*A61L 9/20* (2006.01)
*F24F 8/20* (2021.01)

(52) U.S. Cl.
CPC ................ *A61L 9/205* (2013.01); *F24F 8/20* (2021.01); *A61L 2209/111* (2013.01); *A61L 2209/12* (2013.01); *A61L 2209/16* (2013.01)

(58) Field of Classification Search
CPC ............... A61L 9/205; A61L 2209/111; A61L 2209/12; A61L 2209/16; F24F 8/20;
(Continued)

(56) References Cited

U.S. PATENT DOCUMENTS 4,808,068 A * 2/1989 Asbjornson ........... F04D 27/002
 415/157
11,110,395 B2 9/2021 Drake et al.

FOREIGN PATENT DOCUMENTS

CN 213270338 U * 5/2021
JP 2021-159647 A 10/2021
(Continued)

OTHER PUBLICATIONS

English translation of Chen et al. (Year: 2021).*

*Primary Examiner* — Maris R Kessel
*Assistant Examiner* — Aham Lee
(74) *Attorney, Agent, or Firm* — Morgan, Lewis & Bockius LLP

(57) ABSTRACT

An air cleaning apparatus of a ventilation seat, may include a housing including a flow path configured to allow air to move therethrough; a photocatalyst located in the flow path of the housing and rotatably coupled to the housing to be rotatable with respect to the housing; and a UV LED fixed at the housing and configured to emit light of a light source toward the photocatalyst when power is supplied to the UV LED.

12 Claims, 8 Drawing Sheets

(58) Field of Classification Search
CPC ........... F24F 8/22; B60H 3/06; B60H 3/0078; B60H 2003/065; B60H 2003/0675; A47C 7/742; B60N 2/5621
See application file for complete search history.

(56) References Cited

FOREIGN PATENT DOCUMENTS

| | | |
|---|---|---|
| KR | 10-2006-0107819 A | 10/2006 |
| KR | 10-2211714 B1 | 2/2021 |

* cited by examiner

AIR CLEANING APPARATUS FOR VENTILATION SEAT AND METHOD OF CONTROLLING OPERATION OF APPARATUS

CROSS REFERENCE TO RELATED APPLICATION

The present application claims priority to Korean Patent Application No. 10-2022-0035004, filed Mar. 21, 2022, the entire contents of which is incorporated herein for all purposes by this reference.

BACKGROUND OF THE PRESENT DISCLOSURE

Field of the Present Disclosure

The present disclosure relates generally to an air cleaning apparatus for a ventilation seat and a method of controlling the operation of the apparatus. More particularly, the present disclosure relates to an air cleaning apparatus for a ventilation seat and a method of controlling the operation of the apparatus that are capable of maintaining a ventilation function when an occupant is in an accommodated state and improving a sterilization effect when the occupant is not in the accommodated state by employing a rotating structure of a photocatalyst.

Description of Related Art

To improve riding comfort, the number of vehicles with a ventilation seat is increasing.

An example of such a ventilation seat has a structure in which a flow path that allows air to move therethrough is formed in a seat including a foam pad therein, a blower (fan) is provided at a seat structure coupled to the seat, and the flow path of the seat and the blower are connected to each other by a duct. When the blower operates, air is drawn in into the duct, then moved to the flow path of the seat, and finally discharged toward an accommodated occupant in the seat.

The air inside the vehicle contains harmful substances and odor bacteria that harm the human body. To block the transmission of vehicle interior air containing these harmful substances to the accommodated occupant through the ventilation seat, the use of an air cleaning apparatus connected to the ventilation seat has recently been increasing.

A conventional air cleaning apparatus is a device that provides clean air to accommodated occupants by sterilizing harmful substances and odor bacteria contained in the air inside the vehicle, and generally includes an ultraviolet light emitting diode (UV LED) and a photocatalyst ($TiO_2$, titanium dioxide).

Light from a light source of the UV LED is emitted toward the photocatalyst ($TiO_2$) to cause a photooxidation reduction reaction. As the air containing harmful substances passes through the photocatalyst, the harmful substances are replaced with a small amount of water and carbon dioxide that are harmless to the human body. As a result, only clean air from which harmful substances have been removed is supplied to the accommodated occupants.

However, the conventional air cleaning apparatus applied to the ventilation seat has a structure in which the photocatalyst is fixed in a direction that does not interfere with an air flow as much as possible, i.e., in a horizontal direction parallel to a moving direction of air. Thus, there is a drawback in that the sterilization effect is lowered because the air contact area of the photocatalyst is small.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air cleaning apparatus for a ventilation seat and a method of controlling the operation of the apparatus, the air cleaning apparatus including a rotatable photocatalyst, in which a ventilation function is maintained by disposing the photocatalyst in a horizontal direction parallel to a moving direction of air when an occupant is accommodated in the ventilation seat, and a sterilization effect is improved by disposing the photocatalyst in a direction orthogonal to the moving direction of air when the occupant is not accommodated in the ventilation seat.

In various aspects of the present disclosure, there is provided an air cleaning apparatus for a ventilation seat, the air cleaning apparatus including: a housing including a flow path configured to allow air to move therethrough; a photocatalyst located in the flow path of the housing and rotatably coupled to the housing to be rotatable with respect to the housing; and a UV LED fixed at the housing and configured to emit light of a light source toward the photocatalyst when power is supplied to the UV LED.

The housing may have a first end portion connected to a duct provided with a blower and a second end portion connected to a flow path of the ventilation seat.

The UV LED may be configured as a plurality of UV LEDs that are fixed at the housing at each of positions corresponding to first and second sides of the photocatalyst interposed therebetween, and the plurality of UV LEDs may be provided so that the light generated from each of the respective light sources is emitted toward a center portion of the photocatalyst.

The photocatalyst may be integrally coupled to a rotating plate, and the photocatalyst and the rotating plate may be provided to be integrally rotatable with respect to the housing.

The air cleaning apparatus may further include: a motor configured to generate power for rotating the rotating plate; and a power transmission mechanism configured to rotate the rotating plate by transmitting the power of the motor to the rotating plate.

The power transmission mechanism may include: a rotating plate rod coupled to the rotating plate and protruding through the housing; and a lead screw connecting the motor and the rotating plate rod to each other and configured to rotate the rotating plate by moving forwards and backwards when the motor is operated.

The air cleaning apparatus may further include a controller configured to control operation of the motor and power supply to the UV LED, in which the controller may be configured to control the operation of the motor and the power supply to the UV LED by use of ignition-on and off signals of a vehicle, door lock and open signals, a signal of a seating sensor provided in the ventilation seat, and a voltage signal of a battery.

When the ignition-off signal, the door lock signal, and an occupant non-seating signal are transmitted to the controller, the controller may be configured to control operation of the air cleaning apparatus to be turned on, and when the operation of the air cleaning apparatus is turned on, power may be supplied to the UV LED, so that sterilization by the photocatalyst may be performed.

When the operation of the air cleaning apparatus is turned on, the photocatalyst may be rotated by the operation of the motor by the controller and be thereby provided in a direction orthogonal to a moving direction of air passing through the housing.

When the door open signal is generated during the sterilization or a voltage of the battery is less than a minimum ignition voltage required to start the vehicle, the controller may immediately stop the operation of the air cleaning apparatus.

When any one of the ignition-on signal, the door open signal, or an occupant seating signal is transmitted to the controller, the controller may be configured to control the operation of the air cleaning apparatus to be turned off, and in a turn-off state of the air cleaning apparatus, the power supply to the UV LED may be cut off, so that sterilization by the photocatalyst may not be performed.

In the turn-off state of the air cleaning apparatus, the photocatalyst may be rotated by the operation of the motor by the controller and be thereby provided in a horizontal direction parallel to a moving direction of air passing through the housing.

According to another aspect of the present disclosure, there is provided a method of controlling operation of the air cleaning apparatus, the method including: an occupant determination step of determining whether an occupant is accommodated in the ventilation seat after the vehicle is in an ignition-off state and a door of the vehicle is in a locked state; a voltage determination step of checking a voltage of the battery to determine whether the voltage of the battery is equal to or greater than a minimum operating voltage of the air cleaning apparatus when the controller concludes that no accommodated occupant exists as a result of the determination in the occupant determination step; and an operation-on step of turning on the operation of the air cleaning apparatus when the controller concludes that the voltage of the battery is equal to or greater than the minimum operating voltage of the air cleaning apparatus as a result of the determination in the voltage determination step.

When the controller concludes that a seated occupant exists as a result of the determination in the occupant determination step or when the controller concludes that the voltage of the battery is less than the minimum operating voltage of the air cleaning apparatus as a result of the determination in the voltage determination step, the air cleaning apparatus may be left in a non-operating state.

When the operation-on step is executed, the air cleaning apparatus may be operated for a predetermined time period to perform sterilization, and the operation of the air cleaning apparatus may be terminated after the predetermined time period elapses.

When the operation of the air cleaning apparatus is turned on, sterilization may be performed in a state in which the photocatalyst is provided in a direction orthogonal to a moving direction of air passing through the housing; and when the air cleaning apparatus is left in the non-operating state or the operation of the air cleaning apparatus is turned off, the photocatalyst may be provided in a horizontal direction parallel to the moving direction of air passing through the housing.

According to yet another aspect of the present disclosure, there is provided a method of controlling operation of the air cleaning apparatus, the method including: an ignition determination step of determining whether the vehicle is in an ignition-off state when the operation of the air cleaning apparatus is turned on by use of Bluetooth of a portable terminal; a door determination step of determining whether a door of the vehicle is in a locked state when the controller concludes that the vehicle is in the ignition-off state as a result of the determination in the ignition determination step; an occupant determination step of determining whether an occupant is accommodated in the ventilation seat when the controller concludes that all of doors of the vehicle are in the locked state as a result of determination in the door determination step; a voltage determination step of checking a voltage of the battery to determine whether the voltage of the battery is equal to or greater than a minimum operating voltage of the air cleaning apparatus when the controller concludes that no accommodated occupant exists as a result of the determination in the occupant determination step; and an operation-on step of turning on the operation of the air cleaning apparatus when the controller concludes that the voltage of the battery is equal to or greater than the minimum operating voltage of the air cleaning apparatus as a result of the determination in the voltage determination step.

When the controller concludes that the vehicle is in an ignition-on state as a result of the determination in the ignition determination step, or when the controller concludes that any one of the doors of the vehicle is in an open state as a result of the determination in the door determination step, or when the controller concludes that an accommodated occupant exists as a result of the determination in the occupant determination step, or when the controller concludes that the voltage of the battery is less than the minimum operating voltage of the air cleaning apparatus as a result of the determination of the voltage determination step, the air cleaning apparatus is left in a non-operating state.

When the operation of the air cleaning apparatus is turned on, sterilization may be performed in a state in which the photocatalyst is provided in a direction orthogonal to a moving direction of air passing through the housing; and when the air cleaning apparatus is left in the non-operating state or the operation of the air cleaning apparatus is turned off, the photocatalyst may be provided in a horizontal direction parallel to the moving direction of air passing through the housing.

According to the air cleaning apparatus for the ventilation seat and the method of controlling the operation of the apparatus, when the occupant is not accommodated in the ventilation seat, sterilization is performed as the photocatalyst located in the flow path of the housing is rotated to be provided in the direction orthogonal to the moving direction of air, improving the sterilization effect. On the other hand, when the occupant is accommodated in the ventilation seat, the photocatalyst is rotated to be provided in the horizontal direction parallel to the moving direction of air, minimizing the interference to the air flow caused by the photocatalyst and thus maintaining the ventilation function of the seat.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
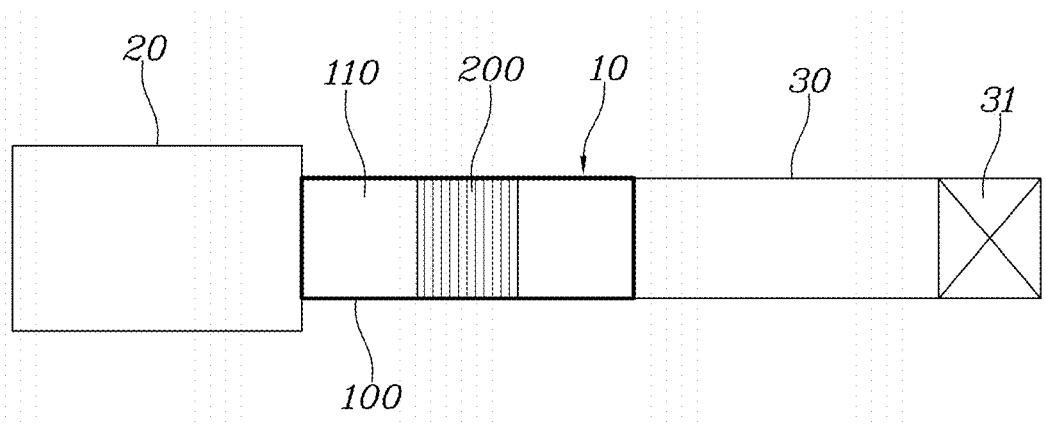
FIG. 1 is a schematic configuration view exemplarily illustrating the installation structure of an air cleaning apparatus for a ventilation seat according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural and functional descriptions of embodiments of the present disclosure included herein are only for illustrative purposes of the embodiments of the present disclosure. The present disclosure may be embodied in many different forms without departing from the spirit and significant characteristics of the present disclosure. Therefore, the embodiments of the present disclosure are included only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. However, the present disclosure should not be construed as being limited to only the embodiments set forth herein, but should be construed as covering modifications, equivalents, or alternatives falling within ideas and technical scopes of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for describing various exemplary embodiments only and is not intended to be limiting. As used herein, the singular forms are intended to include the plural forms as well, unless the context clearly indicates otherwise. It will be further understood that the terms "comprise", "include", "have", etc. When used in the exemplary embodiment, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning which is consistent with their meaning in the context of the present specification and the relevant art and will not be interpreted in an idealized or overly formal sense unless expressly so defined herein.

A controller according to an exemplary embodiment of the present disclosure may be implemented through a non-volatile memory configured to store an algorithm configured to control operations of various components of a vehicle or data relating to software instructions for running the algorithm, and through a processor configured to perform operations to be described below using the data stored in the memory. Here, the memory and the processor may be implemented as individual chips. Alternatively, the memory and the processor may be implemented as a single chip on which the memory and the processor are integrated. The processor may be implemented in a form of one or more processors.

Hereinafter, an air cleaning apparatus of a ventilation seat and a method of controlling the operation of the apparatus according to exemplary embodiments of the present disclosure will be described with reference to the accompanying drawings.

As illustrated in FIGS. 1 to 6, the air cleaning apparatus 10 according to an exemplary embodiment of the present disclosure is applied to a ventilation seat 20 of a vehicle.

That is, the air cleaning apparatus 10 including a photocatalyst 200 is connectedly provided between the ventilation seat 20 including a plurality of flow paths that allow air to be discharged therethrough to an accommodated occupant, and the duct 30 provided with a blower 31.

In FIG. 1, the duct 30 provided with the blower 31 may be connected to the ventilation seat 20, and the air cleaning apparatus 10 may be connected to a right side of the duct 30.

The air cleaning apparatus 10 according to an exemplary embodiment of the present disclosure includes: a housing 100 including a flow path 110 that allows air to move therethrough; the photocatalyst 200 located in the flow path 110 of the housing 100 and rotatably coupled to the housing to be rotatable with respect to the housing 100; and a UV LED 300 fixed at the housing 100 and emitting light of a light source toward the photocatalyst 200 when power is supplied to the UV LED.

The housing 100 has a first end portion connected to the duct 30 provided with the blower 31 and a second end portion connected to the flow paths of the ventilation seat 20.

Thus, the first end portion and the second end portion of the housing 100 serve as an inlet and an outlet that allow air to flow in and out therethrough, and a section between the inlet and outlet is configured as the flow path 110 for guiding the movement of air.

The photocatalyst 200 and the UV LED 300 are provided inside the housing 100. For ease of assembly and disassembly, the housing 100 includes an upper portion and a lower portion, and the upper portion and the lower portion are separably coupled to each other.

The photocatalyst 200 is located in the flow path 110 of the housing 100 and is rotatably provided in the housing 100. The UV LED 300 is configured as a plurality of UV LEDs 300 that are fixed at the housing 100 at each of positions corresponding to first and second sides of the photocatalyst 200 interposed therebetween.

Figure 3:
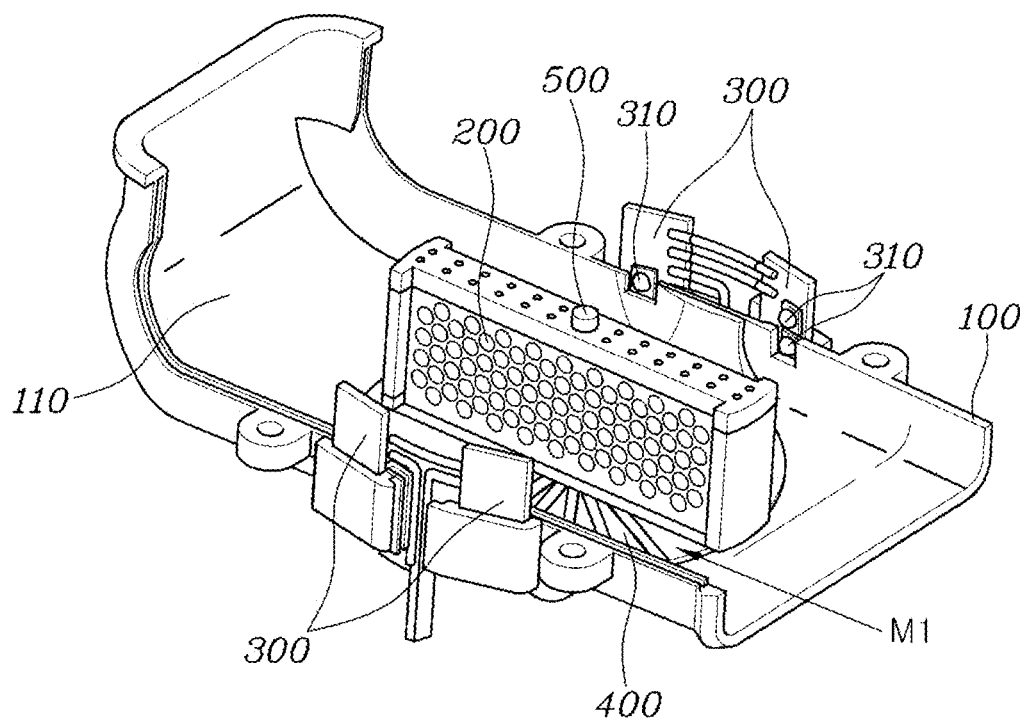

For example, as illustrated in FIG. 3, two UV LEDs 300 are provided on the housing 100 at a position corresponding to a right side of the photocatalyst 200, and two UV LEDs 300 are provided on the housing 100 at a position corresponding to a left side of the photocatalyst 200.

The respective pluralities of UV LEDs 300 provided on the housing 100 have a predetermined inclination angle with respect to the moving direction (arrow M1) of air passing through the flow path 110. In other words, the UV LEDs 300 are provided at a predetermined inclination angle so that light generated from a light source 310 of each of the UV LEDs 300 is emitted toward the center portion of the photocatalyst 200.

The photocatalyst 200 is rotatably located in the center portion of the flow path 110 of the housing 100, and the plurality of UV LEDs 300 are located on the housing 100 at each of positions corresponding to the left and right sides of the photocatalyst 200.

The UV LEDs 300 emit the light of the respective light sources 310 from the left and right sides of the photocatalyst 200 toward the photocatalyst 200, and the photocatalyst 200 sterilizes and removes contaminants, harmful substances, and bacteria contained in the air passing through the flow path 110 through the transmitted light of the UV LEDs 300.

Because the UV LEDs 300 are provided to orient the center portion of the photocatalyst 200 at a predetermined inclination angle, the light from the light sources 310 may be effectively transmitted to the photocatalyst 200 even when the photocatalyst 200 is rotated.

The photocatalyst 200 is integrally coupled to a rotating plate 400 to form a module. The photocatalyst 200 and the rotating plate 400 integrated as a module are provided to be integrally rotatable with respect to the housing 100.

A rotation shaft 500 is integrally provided at each of the center portion of an upper surface of the photocatalyst 200 and the center portion of a lower surface of the rotating plate 400. The respective rotation shafts 500 at upper and lower positions are rotatably coupled to the housing 100.

Figure 2:
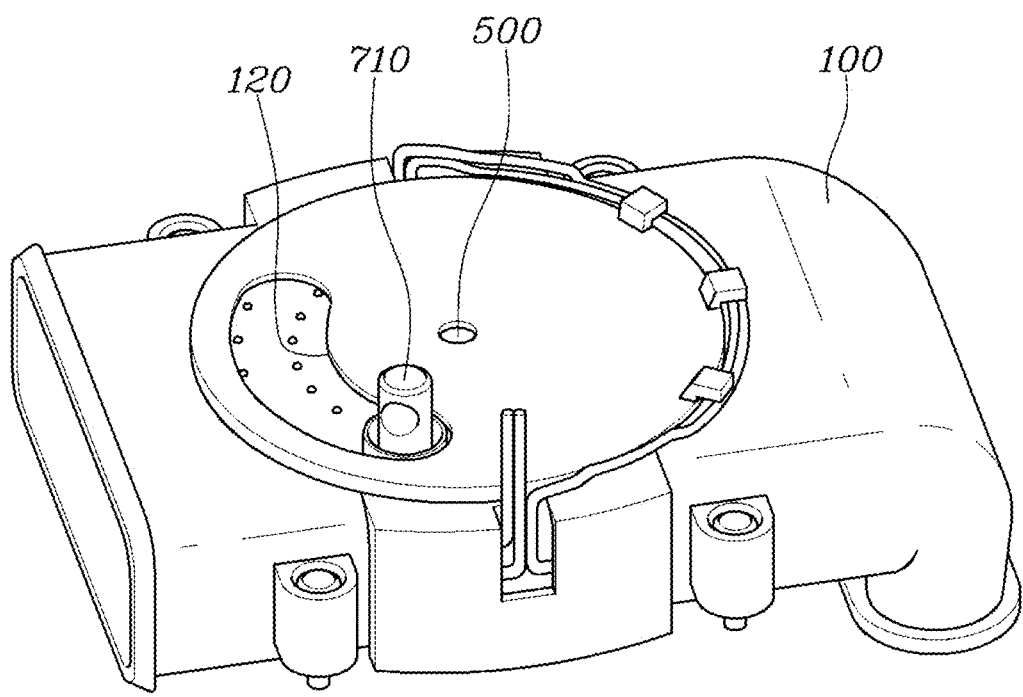
FIG. 2 and FIG. 3 are views exemplarily illustrating a state in which a photocatalyst of the air cleaning apparatus according to an exemplary embodiment of the present disclosure is provided in a horizontal direction parallel to a flow path of a housing.
Figure 4:
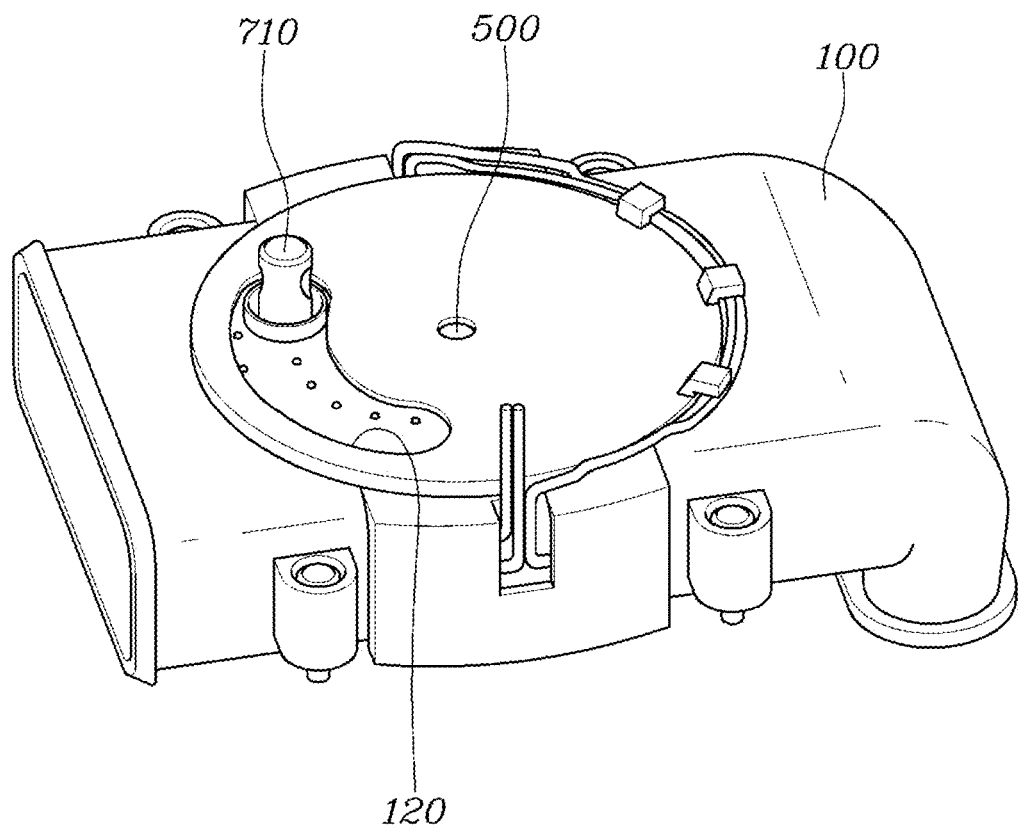
FIG. 4 and FIG. 5 are views exemplarily illustrating a state in which the photocatalyst is provided in a direction orthogonal to the flow path of the housing.
Figure 5:
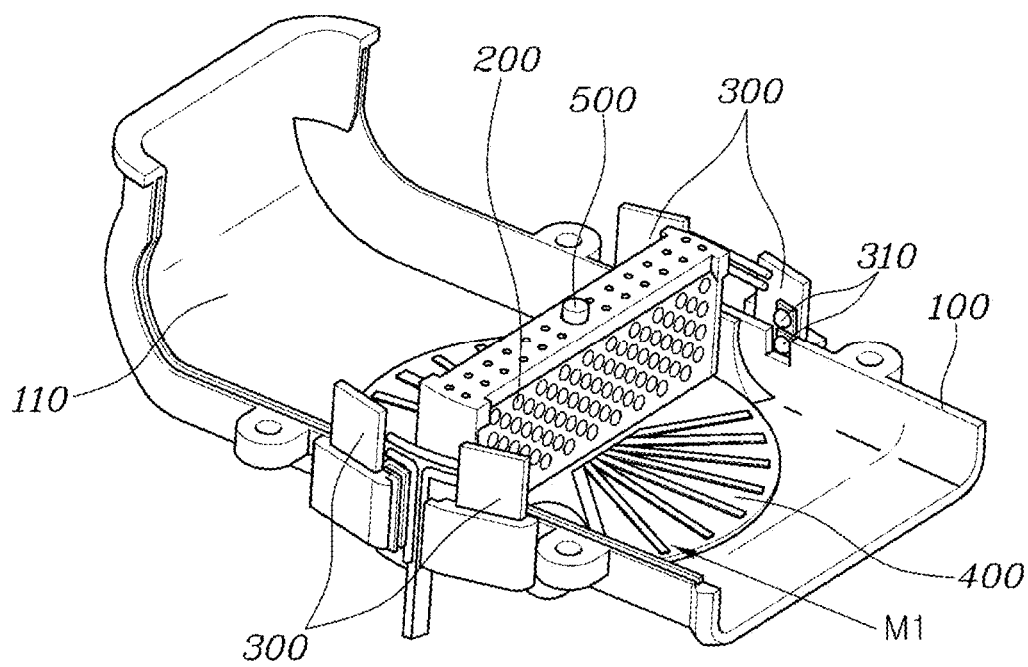
Figure 6:
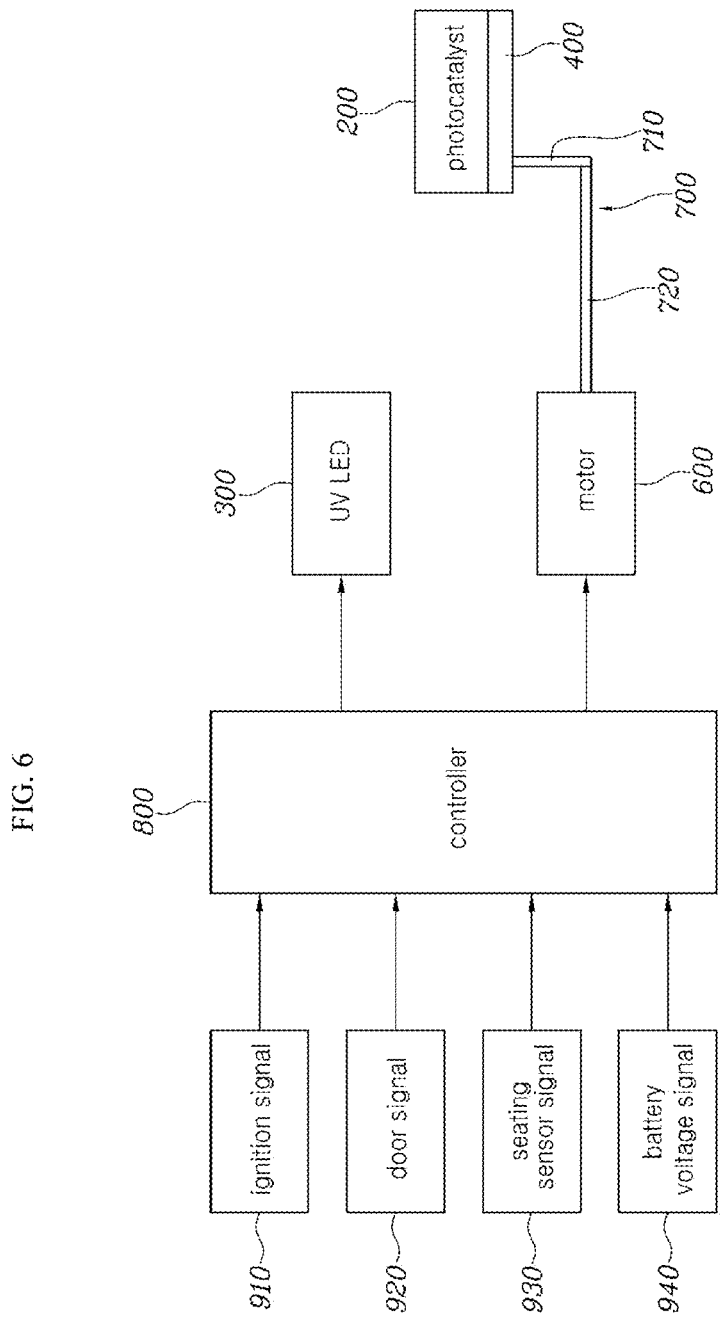
FIG. 6 is a block diagram illustrating the configuration of the air cleaning apparatus of the ventilation seat according to an exemplary embodiment of the present disclosure.

FIG. 2 and FIG. 3 illustrate a state in which the photocatalyst 200 is provided in a horizontal direction parallel to a moving direction (arrow M1) of air passing through the flow path 110 due to the rotation of the photocatalyst 200 and the rotating plate 400 integrated as a module. FIG. 4 and FIG. 5 illustrate a state in which the photocatalyst 200 is provided in a direction orthogonal to the moving direction (arrow M1) of air passing through the flow path 110.

To achieve the rotation of the photocatalyst 200 and the rotating plate 400 integrated as a module, the exemplary embodiment of the present disclosure includes a motor 600 generating power for rotation, and a power transmission mechanism 700 operating to rotate the rotating plate 400 by transmitting the power of the motor 600 to the rotating plate 400.

The motor 600 is a motor including a configuration that enables both clockwise rotation and counterclockwise rotation.

The power transmission mechanism 700 includes a rotating plate rod 710 coupled to the rotating plate 400 and protruding through the housing 100, and a lead screw 720 connecting the motor 600 and the rotating plate rod 710 to each other and rotating the rotating plate 400 by moving forwards and backwards when the motor 600 is operated.

The rotating plate rod 710 has a first end portion coupled to a position radially spaced a predetermined distance apart from the rotation shaft 500 provided in the center portion of the rotating plate 400, and a second end portion protruding out of the housing 100 through the housing 100.

When the rotating plate 400 is rotated about the rotation shaft 500, the rotating plate rod 710 has to be configured to move along a circular arc centered on the rotation shaft 500. To the present end, the housing 100 has a guide slot 120 that allows the rotating plate rod 710 to pass and guide the movement of the rotating plate rod 710 therethrough.

The exemplary embodiment of the present disclosure further includes a controller 800 controlling the operation of the motor 600 and power supply to the UV LEDs 300. The controller 800 controls the operation of the motor 600 and the power supply to the UV LEDs 300 by use of ignition-on or off signals 910 of the vehicle, door lock and open signals 920, a signal 930 of a seating sensor provided in the ventilation seat 20, and a voltage signal 940 of a battery.

The motor 600 is operated in response to a signal from the controller 800, and the lead screw 720 is moved forwards and backwards by the operation of the motor 600. Because the lead screw 720 is connected to the rotating plate 400 through the rotating plate rod 710, when the lead screw 720 is moved, the rotating plate 400 and the photocatalyst 200 integrated as a module are rotated with respect to the housing 100 about the rotation shaft 500.

The photocatalyst 200 may be reciprocally rotated at an angle of 90 degrees and may be provided in the horizontal direction parallel to the moving direction (arrow M1) of air passing through the flow path 110 as illustrated in FIG. 2 and FIG. 3. Alternatively, the photocatalyst 200 may be provided in the direction orthogonal to the moving direction (arrow M1) of air passing through the flow path 110 as illustrated in FIG. 4 and FIG. 5.

When the motor 600 is operated, the linear movement of the lead screw 720 and the rotation of the rotating plate rod 720 cause a difference in movement trajectory between the lead screw 720 and the rotating plate rod 720. The motor 600 is assembled via a separate bracket to absorb the difference in the movement trajectory through the bracket.

In principle, the air cleaning apparatus 10 according to an exemplary embodiment of the present disclosure is operated when no occupant exists inside the vehicle. Examples of the criterion for determining whether an occupant exists may include the ignition-off signal 910, the door lock signal 920, an occupant non-seating signal 930 of the seating sensor of the ventilation seat 20, and a seat belt non-wearing signal.

The seating sensor is provided in the ventilation seat 20 to detect whether an occupant is accommodated, and may be a weight sensor.

Furthermore, according to an exemplary embodiment of the present disclosure, the minimum operating voltage of the air cleaning apparatus 10 may be set to 12.8 V to enable vehicle ignition after air cleaning in consideration of the minimum ignition voltage of 12.5 V and the operating voltage of the air cleaning apparatus 10 of 0.3 V.

When the voltage of the battery is less than the minimum ignition voltage of 12.5 V required to start the vehicle, the operation of the air cleaning apparatus 10 is immediately stopped.

The air cleaning apparatus 10 according to an exemplary embodiment of the present disclosure is operated when no occupant exits in the vehicle interior to purify the vehicle interior air.

In other words, when the ignition-off signal, the door lock signal, and the occupant non-seating signal are transmitted to the controller 800, the controller 800 controls the operation of the air cleaning apparatus 10 to be turned on. When the operation of the air cleaning apparatus 10 is turned on, power is supplied to the UV LEDs 300, so that sterilization by the photocatalyst 200 is performed.

In the turn-on state of the air cleaning apparatus 10, the photocatalyst 200 is rotated by the operation of the motor 600 by the controller 800 and is thereby provided in the direction orthogonal to the moving direction (arrow M1) of air passing through the housing 100 as illustrated in FIG. 4 and FIG. 5. Accordingly, all air moving through the flow path 110 of the housing 100 is sterilized while passing through the photocatalyst 200, resulting in greatly improving a sterilization effect.

When a door open signal is generated during the sterilization or the voltage of the battery is less than the minimum ignition voltage (12.5 V) required to start the vehicle, the controller 800 immediately stops the operation of the air cleaning apparatus 10.

When the operation of the air cleaning apparatus 10 is stopped, the photocatalyst 200 is rotated by the operation of the motor 600 by the controller 800 and is thereby provided in the horizontal direction parallel to the moving direction (arrow M1) of air passing through the housing 100 as illustrated in FIG. 2 and FIG. 3.

The air cleaning apparatus 10 according to an exemplary embodiment of the present disclosure is not operated when an occupant exists inside the vehicle, and in the instant case, the original function of the ventilation seat 20 is performed.

In other words, when any one of the ignition-on signal, the door open signal, or an occupant seating signal is transmitted to the controller 800, the controller 800 controls the operation of the air cleaning apparatus 10 to be turned off. In the turn-off state of the air cleaning apparatus 10, the power supply to the UV LEDs 300 is cut off, so that sterilization by the photocatalyst 200 is not performed.

In the turn-off state of the air cleaning apparatus 10, the photocatalyst 200 is rotated by the operation of the motor 600 by the controller 800 and is thereby provided in the horizontal direction parallel to the moving direction (arrow M1) of air passing through the housing 100 as illustrated in FIG. 2 and FIG. 3. Accordingly, it is possible to minimize the interference to the air flow caused by the photocatalyst 200 and thus maintain a ventilation function of the seat.

The operation control logic of the air cleaning apparatus 10 according to an exemplary embodiment of the present disclosure may be largely divided into a general mode and a Bluetooth mode.

The normal mode may be an auto mode in which the air cleaning apparatus 10 is automatically executed when an occupants gets off the vehicle, and the Bluetooth mode may be a mode in which a user operates the air cleaning apparatus 10 wirelessly by use of an application provided in a portable terminal (smartphone, tablet PC, etc.).

Figure 7:
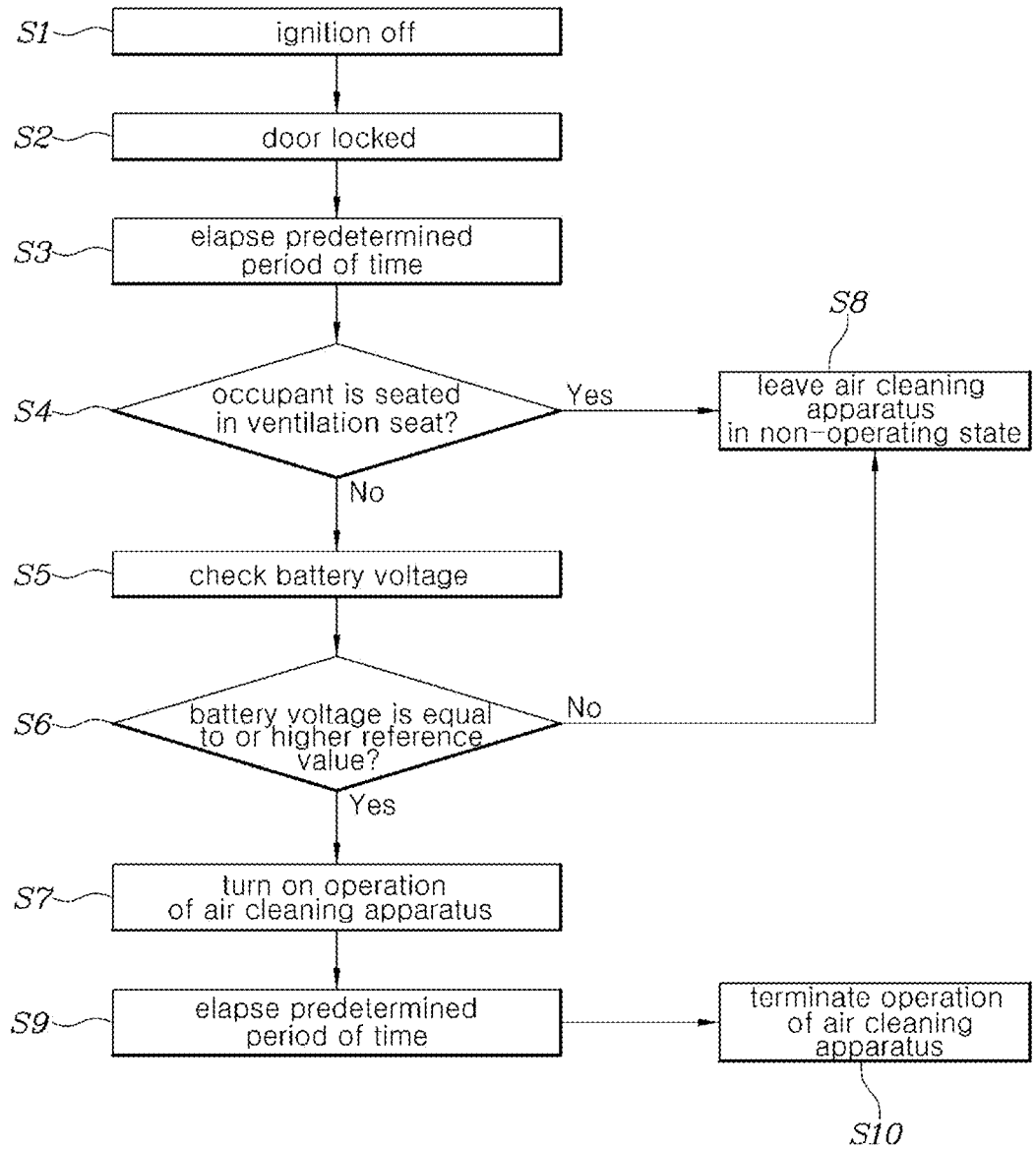
FIG. 7 is a schematic flowchart illustrating the operation control logic of the air cleaning apparatus according to an exemplary embodiment of the present disclosure in a general mode.

FIG. 7 illustrates a flowchart of a logic for controlling the operation of the air cleaning apparatus 10 in the normal mode.

As illustrated, a method of controlling the operation of an air cleaning apparatus for a ventilation seat according to an exemplary embodiment of the present disclosure includes: an occupant determination step (step S4) of determining whether an occupant is accommodated in the ventilation seat 20 after the vehicle is in an ignition-off state (step S1) and a door of the vehicle is in a locked state (step S2); a voltage determination step (step S6) of checking the voltage of the battery (step S5) to determine whether the voltage of the battery is equal to or greater than the minimum operating voltage (12.8 V) of the air cleaning apparatus 10 when the controller concludes that no accommodated occupant exists as a result of the determination in the occupant determination step (step S4); and an operation-on step (step S7) of turning on the operation of the air cleaning apparatus 10 when the controller concludes that the voltage of the battery is equal to or greater than the minimum operating voltage (12.8 V) of the air cleaning apparatus 10 as a result of the determination in the voltage determination step (step S6).

After it is confirmed that the door of the vehicle is in the locked state in step S2, a process of measuring time is executed. At the instant time, a time gap of about 10 minutes is allowed to elapse (step S3). After about 10 minutes elapse, the occupant determination step (step S4) of determining whether the occupant is accommodated in the ventilation seat 20 is performed using the signal of the seating sensor.

On the other hand, when the controller concludes that an accommodated occupant exists as a result of the determination in the occupant determination step (step S4) or when the controller concludes that the voltage of the battery is less than the minimum operating voltage (12.8 V) of the air cleaning apparatus 10 as a result of the determination in the voltage determination step (step S6), the air cleaning apparatus 10 is left in a non-operating state by the controller 800 (step S8).

Accordingly, when the operation-on step (step S7) is executed, the air cleaning apparatus 10 is operated for about 30 minutes to perform sterilization. After a predetermined time period of about 30 minutes elapses (step S9), the operation of the air cleaning apparatus 10 is terminated by the controller 800 (step S10).

When a door open signal is generated during the operation of the air cleaning apparatus 10 or the voltage of the battery is less than the minimum ignition voltage (12.5 V) required to start the vehicle, the controller 800 immediately stops the operation of the air cleaning apparatus 10.

Furthermore, when the operation of the air cleaning apparatus 10 is turned on, sterilization is performed in a state in which the photocatalyst 200 is provided in the direction orthogonal to the moving direction (arrow M1) of air passing through the housing 100 as illustrated in FIG. 4 and FIG. 5. On the other hand, when the air cleaning apparatus 10 is left in the non-operating state or the operation of the air cleaning apparatus 10 is turned off, the photocatalyst 200 is provided in the horizontal direction parallel to the moving direction (arrow M1) of air passing through the housing 100 as illustrated in FIG. 2 and FIG. 3.

Figure 8:
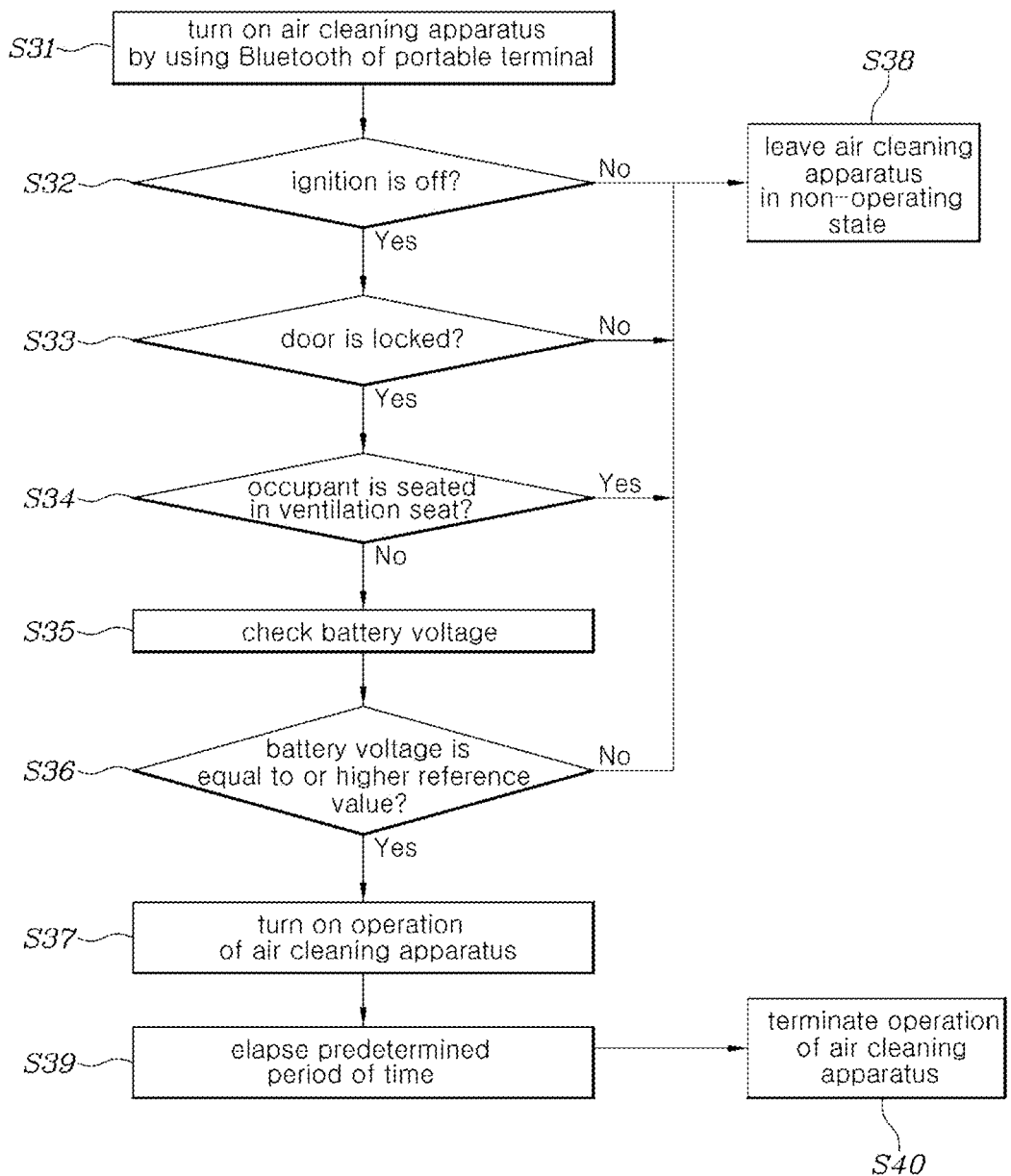
FIG. 8 is a schematic flowchart illustrating the operation control logic of the air cleaning apparatus according to an exemplary embodiment of the present disclosure in Bluetooth mode.

FIG. 8 illustrates a flowchart of a logic for controlling the operation of the air cleaning apparatus 10 in the Bluetooth mode.

As illustrated, a method of controlling the operation of an air cleaning apparatus for a ventilation seat according to an exemplary embodiment of the present disclosure includes: an ignition determination step (step S32) of determining whether the vehicle is in an ignition-off state when the operation of the air cleaning apparatus 10 is turned on by use of Bluetooth of a portable terminal (step S31); a door determination step (step S33) of determining whether a door of the vehicle is in a locked state (step S33) when the controller concludes that the vehicle is in the ignition-off state as a result of the determination in the ignition determination step (step S32); an occupant determination step (step S34) of determining whether an occupant is accommodated in the ventilation seat 10 when the controller concludes that all of doors of the vehicle are in the locked state as a result of determination in the door determination step (step S33); a voltage determination step (step S36) of checking the voltage of the battery (step S35) to determine whether the voltage of the battery is equal to or greater than the minimum operating voltage (12.8 V) of the air cleaning apparatus 10 when the controller concludes that no accommodated occupant exists as a result of the determination in the occupant determination step (step S34); and an operation-on step (step S37) of turning on the operation of the air cleaning apparatus 10 when the controller concludes that the voltage of the battery is equal to or greater than the minimum operating voltage (12.8 V) of the air cleaning apparatus 10 as a result of the determination in the voltage determination step (step S36).

On the other hand, when the controller concludes that the vehicle is in an ignition-on state as a result of the determination in the ignition determination step (step S32), or when the controller concludes that any one of the doors of the vehicle is in an open state as a result of the determination in the door determination step (step S33), or when the controller concludes that a seated occupant exists as a result of the determination in the occupant determination step (step S34), or when the controller concludes that the voltage of the battery is less than the minimum operating voltage (12.8 V) of the air cleaning apparatus 10 as a result of the determination in the voltage determination step (step S36), the air cleaning apparatus 10 is left in a non-operating state by the controller 800 (step S38).

Accordingly, when the operation-on step (step S37) is executed, the air cleaning apparatus 10 is operated for about 30 minutes to perform sterilization. After a predetermined time period of about 30 minutes elapses (step S39), the operation of the air cleaning apparatus 10 is terminated by the controller 800 (step S40).

When a door open signal is generated during the operation of the air cleaning apparatus 10 or the voltage of the battery is less than the minimum ignition voltage (12.5 V) required to start the vehicle, the controller 800 immediately stops the operation of the air cleaning apparatus 10.

As described above, according to the exemplary embodiment of the present disclosure, when the occupant is not accommodated in the ventilation seat 20, sterilization is performed as the photocatalyst 200 located in the flow path 110 of the housing 100 is rotated to be provided in the direction orthogonal to the moving direction (arrow M1) of air, improving the sterilization effect. On the other hand, when the occupant is accommodated in the ventilation seat 20, the photocatalyst 200 is rotated to be provided in the horizontal direction parallel to the moving direction (arrow M1) of air, minimizing the interference to the air flow caused by the photocatalyst 200 and thus maintaining the ventilation function of the seat.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air cleaning apparatus for a ventilation seat, the air cleaning apparatus comprising:
   a housing including a flow path configured to allow air to move therethrough;
   a photocatalyst located in the flow path of the housing and rotatably coupled to the housing to be rotatable with respect to the housing, the photocatalyst being integrally coupled to a rotating plate;
   an ultraviolet light emitting diode (UV LED) fixed at the housing and configured to emit light of a light source toward the photocatalyst when power is supplied to the UV LED;
   a motor coupled to the rotating plate and configured to generate power for rotating the rotating plate; and
   a controller configured to control operation of the motor and power supply to the UV LED,
   wherein the controller is configured to control the operation of the motor and the power supply to the UV LED by use of ignition-on or off signals of a vehicle, door lock and open signals, a signal of a seating sensor provided in the ventilation seat, and a voltage signal of a battery.

2. The air cleaning apparatus of claim 1, wherein the housing has a first end portion connected to a duct provided with a blower and a second end portion connected to a flow path of the ventilation seat.

3. The air cleaning apparatus of claim 1,
   wherein the UV LED is configured as a plurality of UV LEDs that are fixed at the housing at each of positions corresponding to first and second sides of the photocatalyst interposed therebetween, and
   wherein the plurality of UV LEDs are provided so that the light generated from each of the respective light sources is emitted toward a center portion of the photocatalyst.

4. The air cleaning apparatus of claim 1,
   wherein the photocatalyst and the rotating plate are provided to be integrally rotatable with respect to the housing.

5. The air cleaning apparatus of claim 4, further including:
   a power transmission mechanism configured to rotate the rotating plate by transmitting the power of the motor to the rotating plate.

6. The air cleaning apparatus of claim 5, wherein the power transmission mechanism includes:
   a rotating plate rod coupled to the rotating plate and protruding through the housing; and
   a lead screw connecting the motor and the rotating plate rod to each other and configured to rotate the rotating plate by moving forwards and backwards when the motor is operated.

7. The air cleaning apparatus of claim 6,
   wherein the housing includes a guide slot having a shape of arc, and
   wherein an end portion of the rotating plate rod is coupled to the guide slot to guide movement of the rotating plate rod through the guide slot.

8. The air cleaning apparatus of claim 1, wherein when the ignition-off signal, the door lock signal, and an occupant non-seating signal are transmitted to the controller, the controller is configured to control operation of the air cleaning apparatus to be turned on, and when the operation of the air cleaning apparatus is turned on, the power is supplied to the UV LED, so that sterilization by the photocatalyst is performed.

9. The air cleaning apparatus of claim 8, wherein when the operation of the air cleaning apparatus is turned on, the photocatalyst is rotated by the operation of the motor by the controller and is thereby provided in a direction orthogonal to a moving direction of air passing through the housing.

10. The air cleaning apparatus of claim 8, wherein when the door open signal is generated during the sterilization or a voltage of the battery is less than a minimum ignition voltage required to start the vehicle, the controller is configured to stop the operation of the air cleaning apparatus.

11. The air cleaning apparatus of claim 1, wherein when one of the ignition-on signal, the door open signal, or an occupant seating signal is transmitted to the controller, the controller is configured to control the operation of the air cleaning apparatus to be turned off, and in a turn-off state of the air cleaning apparatus, the power supply to the UV LED is cut off, so that sterilization by the photocatalyst is not performed.

12. The air cleaning apparatus of claim 11, wherein in the turn-off state of the air cleaning apparatus, the photocatalyst is rotated by the operation of the motor by the controller and is thereby provided in a horizontal direction parallel to a moving direction of air passing through the housing.

\* \* \* \* \*